United States Patent [19]

Hayes

[11] Patent Number: 5,574,767
[45] Date of Patent: Nov. 12, 1996

[54] ADJUSTABLE X-RAY CASSETTE HOLDER

[75] Inventor: Kenneth J. Hayes, Northridge, Calif.

[73] Assignee: Hayes Technology, Inc., Canoga Park, Calif.

[21] Appl. No.: 397,662

[22] Filed: Feb. 27, 1995

[51] Int. Cl.$^6$ .......................... G03B 42/02; G03B 42/04
[52] U.S. Cl. .......................... 378/167; 378/169; 378/187
[58] Field of Search .................................... 378/189, 167, 378/169, 172, 173, 181, 182, 187, 191, 195, 197

[56] References Cited

U.S. PATENT DOCUMENTS 2,220,725  11/1940  Moe .......................................... 378/196
2,571,011  10/1951  Chapman ................................. 378/181

*Primary Examiner*—Don Wong
*Attorney, Agent, or Firm*—Clifton W. Thompson

[57] ABSTRACT

An X-ray film cassette holder which is small, lightweight, simple and economical to construct and use, having a base carrying an expandable frame incorporating two upwardly expandable risers releasably lockable in a plurality of expanded positions, said risers separated by a releasably lockable variable distance; and two film cassette clamps, each of which is pivotably carried by one of said upwardly expandable risers, and releasably lockable in fixed relation thereto, as well as provision for releasably lockable rotatable mounting of a cassette tray sized within a range determined by the variable distance between said risers on said frame, collectively adapted to hold cassettes steadily in a range of vertical positions above a surface whereon it is placed, at any inclination, and being rotatable on said surface, providing desirable adjustability for positioning an X-ray film cassette adjacent a portion of a patient's anatomy for convenient imaging thereof.

20 Claims, 3 Drawing Sheets

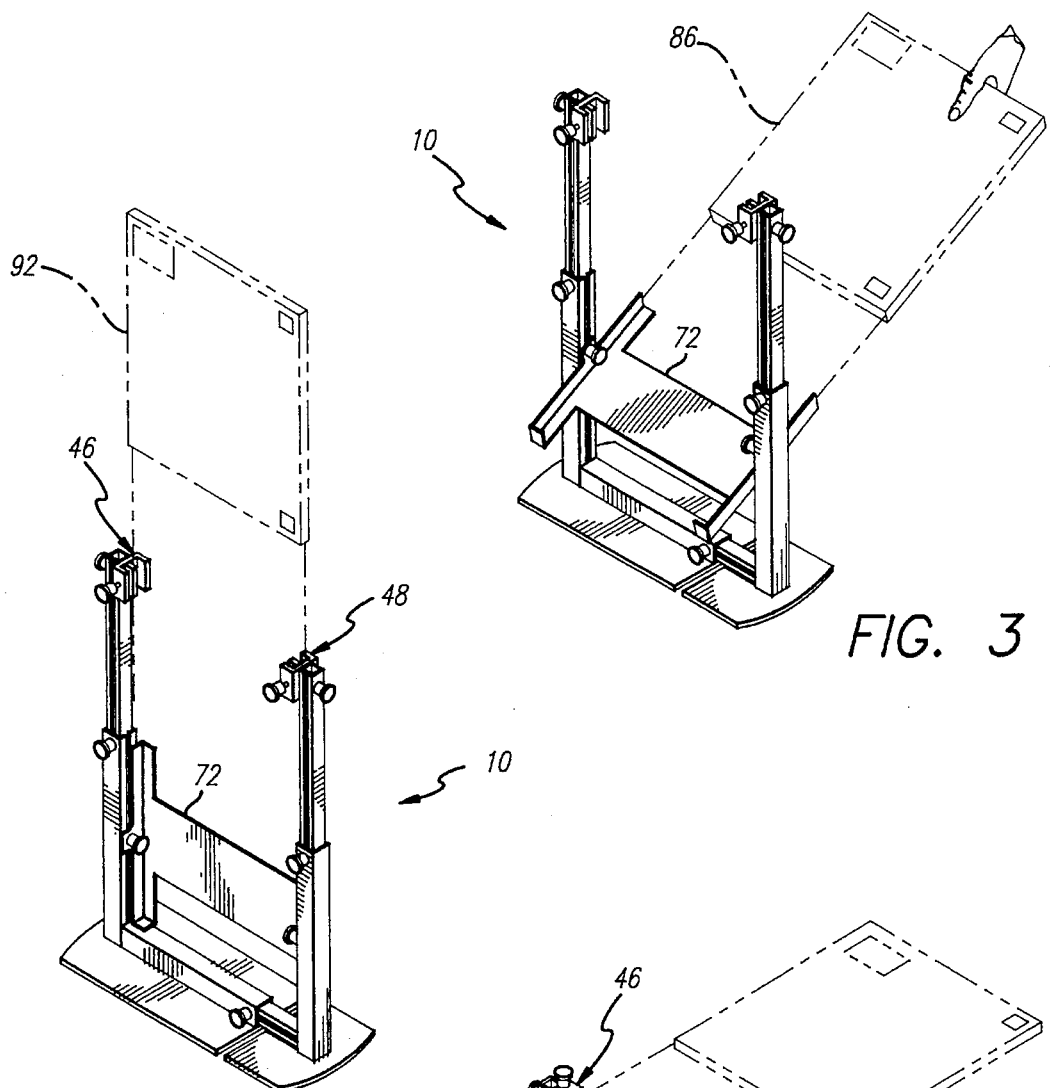
FIG. 3
FIG. 4
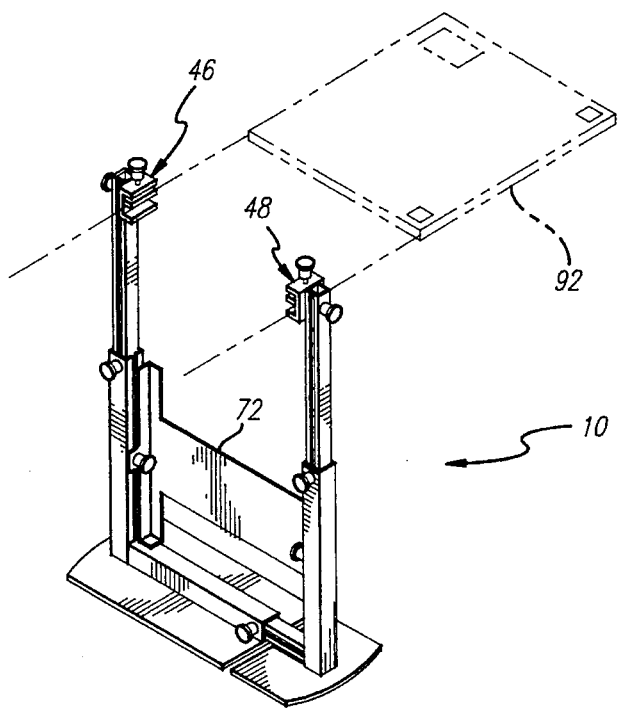
FIG. 5

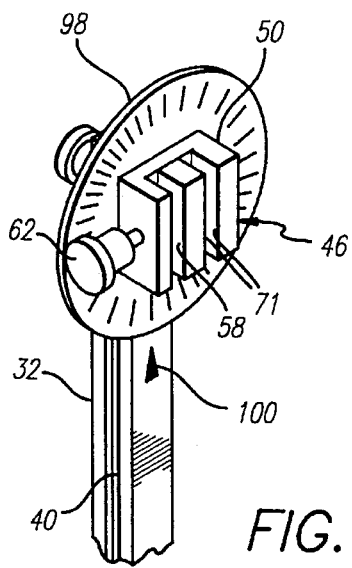
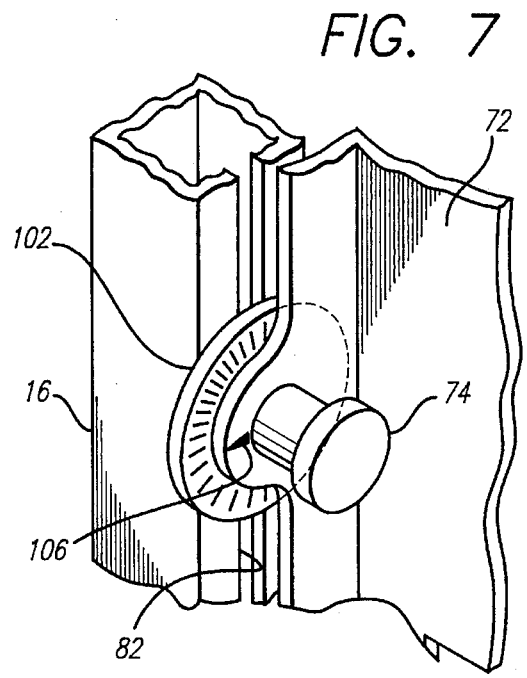
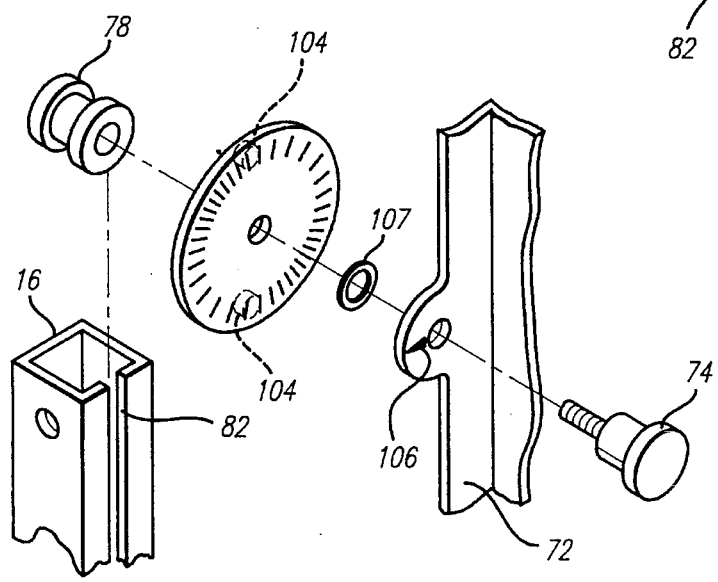
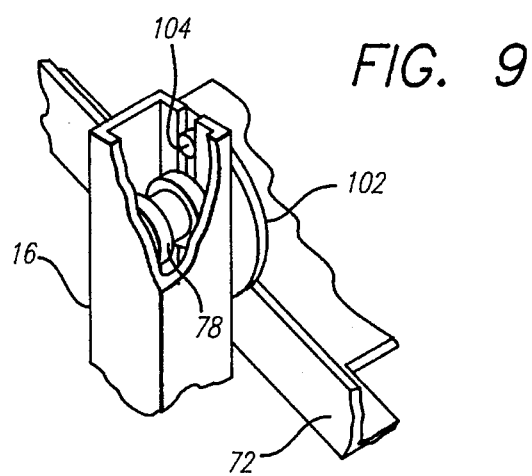

ADJUSTABLE X-RAY CASSETTE HOLDER

BACKGROUND OF THE INVENTION

1. Field of Use

The present invention relates generally to medical imaging equipment. More specifically, it is directed to a film cassette holder for radiological imaging, which facilitates adjustably positioning imaging film adjacent, and separately configurable from, x-ray imaging equipment, and is used in conjunction therewith to produce a radiograph image on said film.

2. Description of the Related Art

Medical imaging, and particularly the use of roentgen rays, and films developed by exposure thereto, have been known for decades. It is well known that such equipment is generally cumbersome due to size constraints inherent in the equipment itself, and particularly the shielding required. Consequently, elaborate provisions have conventionally been provided for adjustability and directability of the imaging equipment to capture the various particular views of a patient's anatomy that may be desired by an attending physician.

Furthermore, because of the difficulty of adjusting the orientation of such equipment as a result of its bulk and weight, it has often been the practice of radiologists to adjust the relative positions of the patient, imaging film (enclosed in a film cassette or otherwise protected from ambient radiation), and the equipment's radiation source so as to obtain the desired medical imaging result. This, too, however, is difficult in many cases, and further can be uncomfortable (if not painful) for the patient depending upon the particular affliction involved and area of the anatomy being imaged in a particular instance.

Those concerned with the art have recognized the desirability of providing greater adjustability in the relative orientations and positional relationships of the source of roentgen rays or other radiation to the patient and the film to be exposed in order to facilitate more convenient imaging of the portion of anatomy of the patient of interest. For example, these provisions include being able to position and orient the patient in a number of possible positions by changing the orientation and/or the position of the table of the imaging equipment whereon the patient, or the desired portion of the patent's anatomy, is placed, said table containing or supporting the film cassette containing film to be exposed, and correspondingly changing the position and/or orientation of the radiation source. However, provisions for moving the imaging equipment have not provided medical imaging of this type which is, in all cases, convenient or free of discomfort for the patient. Because of its bulk and weight, changes in position and orientation of the equipment occur relatively slowly in conventional equipment. Valuable time is lost changing configurations, or rather, the patient is required assume uncomfortable or inconvenient positions during imaging processes.

In response to these and other concerns, cassette holders have been devised to position the film cassette in relation to the patient and the source of radiation, such cassette holders being independent devices. For example, certain conventional cassette holders comprise a wheeled, vertically adjustable stand, having a transverse swinging boom incorporating a cassette tray at one end. Said cassette tray is usually pivotable with respect to said boom. To counter the weight of the boom and cassette tray and an inserted cassette, ballast may be provided at the opposite end of such a conventional boom.

Such conventional cassette holders provide increased flexibility and convenience in medical imaging, but such cassette holders may inherently be somewhat unstable, requiring the patient to manually steady the cassette during imaging. For example, such steadying is conventionally required in a tangential (axial) projection of the patella, for example. Alternately, the operator of the imaging equipment may use towels or other materials to position and steady the film cassette, or simply have the patient hold the film cassette without using a cassette holder. This use of towels and the like is common, for example, in the axial projection of the intercondyloid fossa.

Moreover, due to the above-mentioned ballasting, and/or rigidity desirable in conventional cassette holders, such conventional cassette holders can be themselves quite heavy and cumbersome. These considerations make these conventional cassette holders inconvenient to use in certain applications.

What is recognized as desirable, and is provided by the present invention, is a way to more conveniently position and orient an X-ray or other radiation responsive film cassette in relation to a radiation source and a portion of the patient's anatomy to be imaged for convenient, and more comfortable for the patient relative orientation and positioning of the film, patient, and radiation source.

SUMMARY OF THE INVENTION

The X-ray film cassette holder of the present invention comprises a base, as well as an adjustably expandable mounting frame incorporating two upwardly expandable risers releasably lockable in a plurality of expanded positions, said risers separated by a releasably lockable variable distance, and two film cassette clamps, each of which is pivotably carried by one of said upwardly expandable risers, and releasably lockable in fixed relation thereto.

The cassette holder, in a more detailed aspect, also incorporates a cassette tray pivotably and releasably mounted between said risers, adapted to receive and carry a film cassette; and locking screws pivotably carrying said cassette tray, said locking screws releasably engaging said risers and said cassette tray and releasingly holding them together in a releasable fixed positional and rotational relationship, to provide an adjustable fixed mounting of said film cassette in said cassette tray. The cassette holder of the invention thereby provides rotational positioning in two orthogonal axes, as well as translational positioning in 3-space, and can be placed on the table of existing X-ray or other radiation imaging equipment, or otherwise adjacent such equipment, and can be conveniently positioned with respect to the patient and the radiation source so as to provide a convenient orientation of the film for imaging the desired portion of the patient's anatomy.

In a further, more detailed, aspect, the frame is adjustable to accommodate different sizes of radiation responsive imaging film cassettes. In particular, different film sizes are accommodated by the film cassette holder frame telescoping to the desired distance between attachment points comprising the cassette clamps or points of attachment of a cassette tray of appropriate size. Subsequently, the film cassette is inserted in the tray, or the film cassette clamps and the cassette releasably fixed in position and angulation by tightening locking screws.

Again in a further more detailed aspect, the cassette holder of the invention allows the film cassette to lockably rotate about an axis generally parallel to a plane defined by the table of the x-ray equipment or other surface upon which the base of the cassette holder is placed. The mounting bracket is adjustable in a direction perpendicular to the plane defining the base to allow the film to be raised or lowered with respect to the table of the equipment or other surface irrespective of its rotational relationship to the table of the x-ray imaging equipment or other surface. Translational and rotational adjustment of the cassette holder on the table or other surface provides the further degrees of freedom of movement for complete adjustability of position and orientation within reasonable and usable space in proximity to the source of radiation. This combined with its relatively small size allows for convenient placement of the patient and the film cassette for more convenient imaging of the desired portion of the patient's anatomy.

BRIEF DESCRIPTION OF THE DRAWINGS

FIG. 3 is an isometric view of the film cassette holder of FIG. 1 of the invention illustrating loading of a film cassette tray disposed in an inclined orientation with respect to the rest of the film cassette holder;

FIG. 4 is an isometric view of the cassette holder of FIG. 1 showing vertical loading of a film cassette;

FIG. 5 is an isometric view of the cassette holder of FIG. 1 showing loading of a film cassette in film cassette clamps of the cassette holder;

FIG. 6 is an enlarged perspective fragmentary view of a alternate embodiment of cassette holder of the invention showing a circular scale associated with a film cassette clamp;

FIG. 7 is an enlarged perspective view of a portion of the cassette holder of the invention of an alternate embodiment of cassette holder of the invention showing a circular angulation scale associated with a film cassette tray;

FIG. 8 is an enlarged perspective exploded fragmentary view of a portion of the film cassette holder of FIG. 7 showing details of construction; and FIG. 9 is an enlarged perspective view, shown partially in cutaway, of the film cassette holder of the alternate embodiment of the film cassette holder of FIGS. 7 and 8 showing further details of construction.

DETAILED DESCRIPTION OF THE PREFERRED EMBODIMENTS

Figure 1:
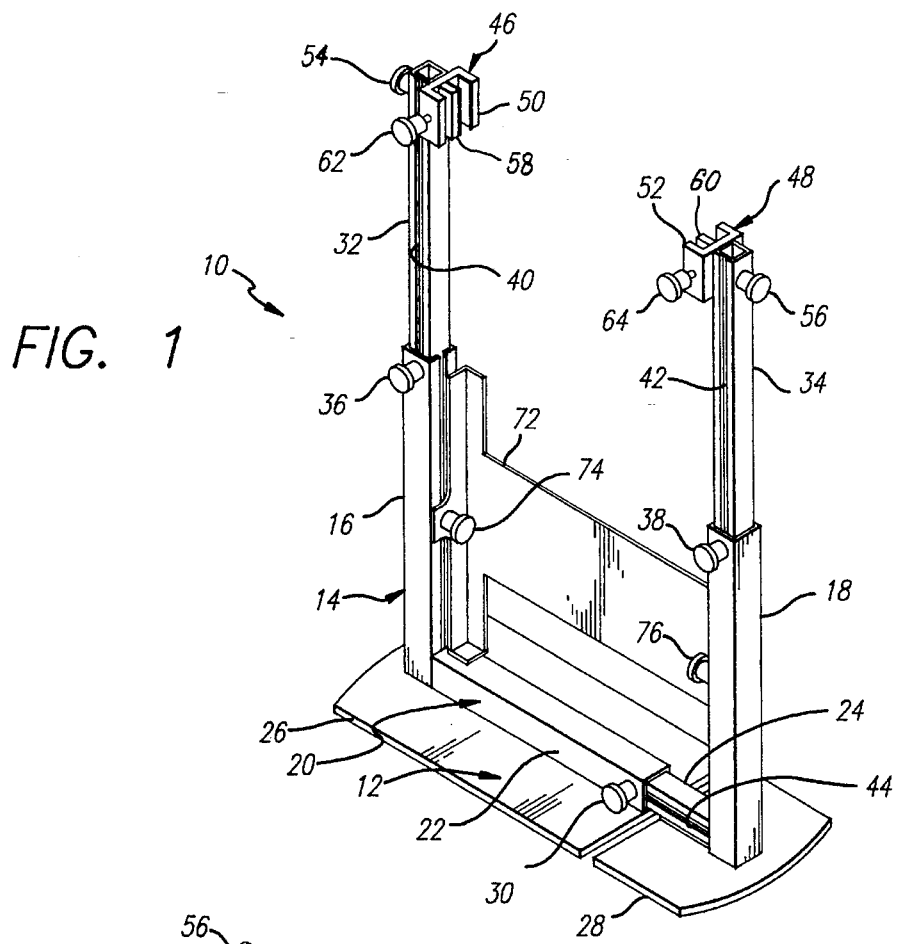
FIG. 1 is an isometric view of a film cassette
Figure 2:
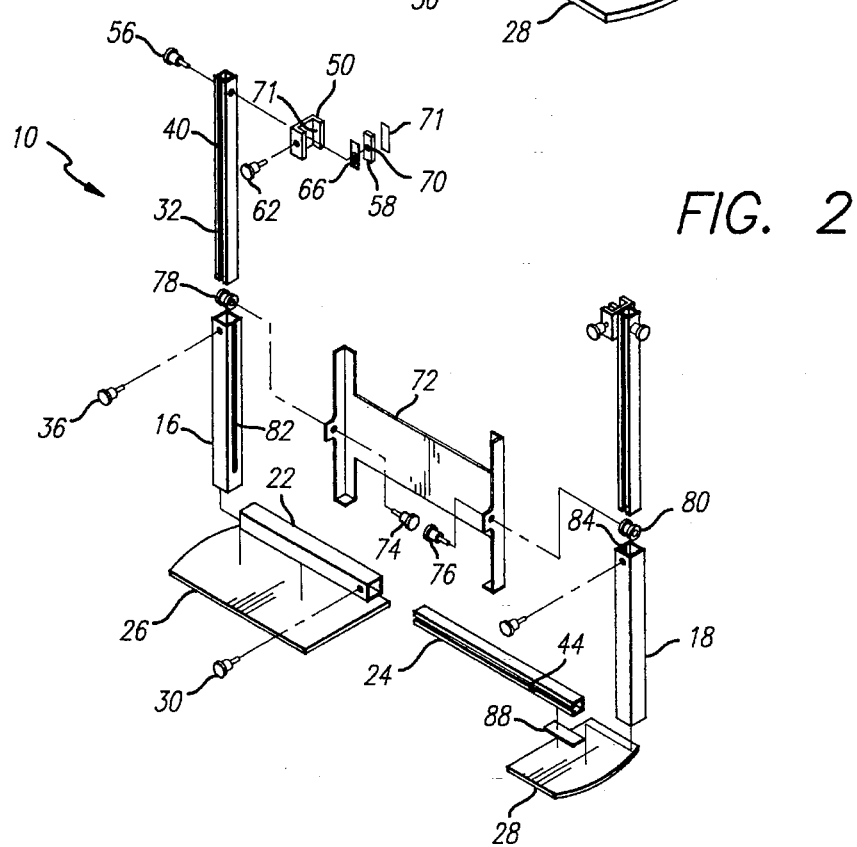
FIG. 2 is an exploded isometric view of the cassette. holder of FIG. 1 showing further details of construction.

Referring to FIGS. 1 and 2 of the accompanying drawings, which are provided by way of example and not by way of limitation, the invention is embodied in an x-ray film cassette holder 10 having a base 12, a frame 14 having two risers comprising upright sleeves 16, 18 and an expandable transverse portion 20 connecting the two upright sleeves 16, 18 at the base 12. The expandable transverse portion comprises a level sleeve 22 and a level telescoping element 24. The base 12 is split in two pieces, a first base portion 26, to which is attached the level sleeve 22 and one of the upright sleeves 16. A second base portion 28 is attached to the level telescoping frame element 24 and upright sleeve 18. Thus the cassette holder is expandable, and the configuration provides for mounting of various sizes of film cassettes (not shown).

The level telescoping element 24 is slidably engaged within level sleeve 22, and is lockable with respect thereto by means of a frictional locking screw 30. This arrangement allows the second base portion 28, the level telescoping element 24 and upright sleeve 18 to move laterally with respect to the rest of the frame comprising the first base portion 26 level sleeve 22 and upright sleeve 16. The frictional locking screw, which allows the level telescoping element's position with respect to the level sleeve to be releasably fixed, is conventional in the illustrated embodiment, comprising a threaded screw element which engages a threaded hole (not shown) in level sleeve 22 to fictionally engage the level telescoping element by applying a lateral force thereto in a conventional manner. It will be apparent to one skilled in the art that the illustrated frictional locking screw 30 could be replaced by other locking devices, for example, by a conventional "quick release" lever engagement employing a force applying element (not shown) which is moved in and out of frictional engagement with the level telescoping element 24 by actuating a hinged locking lever (not shown).

Upright sleeves 16 and 18 likewise slidably receive upright riser telescoping elements 32 and 34. The position of each upright riser telescoping element can be fixed by tightening frictional locking screws 36 and 38. As with the frictional locking screw 30 associated with the level sleeve 22, frictional locking screws on the upright sleeves 16, 18 could be replaced by other means of fixing the relative positions of the upright telescoping elements and the upright sleeves; for example, by using "quick release" locking levers as mentioned in connection with level sleeve 22 and level telescoping element 24 above.

Upright telescoping elements 32 and 34, as well as level telescoping element 24, each embody a channel, 40, 42 and 44 respectively for receiving the frictional locking screws 36, 38, and 24 respectively. These channels serve to further stabilize the respective telescoping elements, particularly in preventing relative rotational movement between the upright telescoping elements 32 and 34 and upright sleeves 16 and 18, due to deformation of the upright sleeves, which are slotted along one side as will be discussed below, and, therefore, relatively more susceptible to deformation. Also, the channels 40, 42 and 44 somewhat mask surface denting and scarring of the respective telescoping elements due to engagement by the frictional locking screws 30, 36 and 38 respectively.

Each of two film cassette retaining clamps 46, 48 are pivotably attached adjacent the upper end of upright riser telescoping elements 32 and 34 respectively. These film cassette retaining clamps are, in the illustrated embodiment, a C-shaped bracket 50, 52 attached to upright riser telescoping elements 32 and 34 by frictional locking screws 54 and 56. When said frictional locking screws are loosened, the film cassette retaining clamps 46 and 48 are rotatable about the axes of the frictional locking screws. When the frictional locking screws are tightened, the C-shaped bracket 50, 52 is held tightly against the upright telescoping elements 32, 34 and are held in a specific angular relationship thereto by friction.

Film cassette retaining clamps 46 and 48 further comprise film cassette bearing plates 58 and 60, incorporated in clamps 46 and 48 respectively. Said bearing plates interact with the C-shaped brackets 50 and 52 to form a clamp 46, 48 to engage the film cassette. The bearing plates are pivotably attached to frictional locking screws 62, 64 in a conventional manner to allow the locking screws to rotate with relation to the bearing plates, yet retain the bearing plates at the end of said locking screws 62 and 64. This may be done, for example, in the illustrated embodiment, by providing an annular groove (not shown) near the end of the frictional locking screws 62 and 64 which is engaged by slotted locking plates 66 and 68 associated with each bearing plate 58 and 60 respectively. The end of the frictional locking screws 62 and 64 interfit with depressions, such as a shallow hole 70, in the back of bearing plate 58, and the inner surfaces of the depression 70 receive applied forces from the frictional locking screw 62 which are distributed by the bearing plate 58 to the cassette holder (not shown) and prevent the locking screws from slipping sideways with respect to the bearing plates. The locking plates 66, 68 are fixedly attached to the bearing plates 58, 60, for example by fasteners (not shown) or adhesives, with the locking screws retained in the slot and depression of the locking plates and bearing plates, respectively, thereby rotatably attaching the bearing plates to the locking screws.

Furthermore, both bearing plates 58 and 60 and C-shaped brackets 50 and 52, at the surfaces where they contact the film cassette holder 50, incorporate a laminated layer of polymeric resin 71, thereon. Said polymeric resin layer comprises the portions of the film cassette retaining clamps 46, 48 actually in contact with the film cassette holder during use. The polymeric resin laminate layer is incorporated for the purpose of reducing scratching and scarring of the film cassette (not shown) during use. Said laminate layers 71 may also be formed of materials adapted to provide improved frictional engagement of the film cassette holder when it is clamped in the film cassette retaining clamps 46 and 48, respectively. Such materials could include, for example, relatively hard material or synthetic rubbers.

As can be appreciated, the distance between upright riser telescoping elements of the frame 32 and 34 can be adjusted. This adjustability allows the cassette holder 10 to accommodate film cassette holders of various sizes.

With the frame of the cassette holder 10 configured so that the upright riser sleeves (16 and 18) and telescoping elements 32 and 34 are in the closest proximity one to another, a standard 14"×17" x-ray film cassette can be accommodated between the film cassette retaining clamps 46 and 48. Moreover, a separate film cassette tray 72 can be positioned between the upright sleeves 16 and 18 by means of frictional locking screws 74 and 76 which are received in, and threadably engage, cylindrical sliders 78 and 80 which are slidably received in upright sleeves 16 and 18 respectively. This film cassette tray is sized to accommodate a standard film cassette in the illustrated embodiment.

A slotted portion 82, 84 of upright sleeves 16 and 18, respectively, allow the film cassette tray with its associated frictional retaining screws 74 and 76 and cylindrical sliders 78 and 80 to be vertically adjustable with respect to the frame of the cassette holder 10. This configuration provides both translational and rotational adjustability of the film cassette tray within the slotted portions of the upright sleeves 16 and 18. As will be apparent, the cassette holder of this invention can accommodate film cassette trays 72 of various sizes due to the adjustability of the distance between upright sleeves 16 and 18.

Referring to FIG. 3, it can be seen that the rotational and translational adjustability of the film cassette tray 72 allows a film cassette 86 to be adjustably positioned within the cassette holder 10. Referring again to FIG. 2 of the drawing figures, further details of the construction of the cassette holder can be seen. A spacing plate 88 is positioned between the level telescoping element 24 and the second base portion 28 to compensate for the wall thickness of level sleeve 22 of the frame of the cassette holder 10.

In further detail, cylindrical sliders 78 and 80 slidably retained in the upright sleeves 16 and 18 respectively, have an annular channel 90 roughly corresponding to the channel 40, 42 provided in the upright telescoping elements 32 and 34 respectively. This annular channel provides clearance for inserting the cylindrical elements in the upright sleeve portions past the frictional locking screws 36 and 38 in upright sleeves 16 and 18 respectively.

Referring now to FIGS. 4 and 5, it will be apparent to one skilled in the art that the cassette holder 10 of the invention will accommodate a film cassette 92 in various orientations so as to conveniently allow imaging of the particular portion of the patient's anatomy (not shown) desired. In FIG. 4, it can be appreciated that a film cassette can be inserted vertically into the cassette holder 10, or as shown in FIG. 5, horizontally, and it will be appreciated that the inclination of the film cassette can be infinitely adjusted to any inclination there-between. Elevation of the film cassette above the base 12 of the frame of the cassette holder is adjustable by adjustable positioning of the upright riser telescoping elements 32 and 34 within upright sleeves 16 and 18 or by positioning the film cassette tray 72 within the extent of slotted portion 82 and 84 of the upright riser sleeves.

As will be apparent to one skilled in the art the cassette holder 10 of the invention could be fabricated from a number of different materials. In a preferred embodiment T-6 aluminum is used. As will also be apparent, various surface treatments may be employed, such as grey hard anodized, black anodized, powder coat, or clear coat finishes.

Alternatively, other materials, such as steel and other metals and metal alloys, resins, fiber-reinforced resins, and/or other composites, may be employed, which materials may have weight and/or strength advantages. However, as will be apparent to one skilled in the art, in the illustrated embodiment the cassette holder may be manufactured economically from pre-formed extrusions, sheet, and other stock aluminum parts readily available in the United States and throughout the world. The relatively light weight, and ease of machining or otherwise working aluminum, combined with its resistance to corrosion, are other factors making the material desirable for this application.

Referring to FIGS. 6, 7, 8 and 9, it can be appreciated by one skilled in the art that the particular inclination of the film cassette with respect to the base could be indicated by means of the addition of inclination indicative scales embodied in the cassette holder 10. Referring specifically to FIG. 6, with respect to film cassette retaining clamps 46 and 48, conventional circular scale could be employed in conjunction with a circular scale 98 could be employed in conjunction with an indicator 100 positioned on each of the upright telescoping elements 32 and 34 respectively, to provide a readout of the angulation of the film cassette 92 with respect to the base 12. Such a scale and indicator could be, for example, painted, stamped or etched, or defined by other variations of the surface 5 treatment of the material from which the cassette holder is formed.

Furthermore, referring specifically to FIGS. 7, 8, and 9, such angulation indication could be provided for the film cassette tray 72, in the illustrated embodiment of the accompanying drawings. With reference to these figures, a circular scale ring 102 is positioned between the film cassette tray 72 and an upright telescoping element 32 or 34. The circular scale ring 102 embodies one or more positioning pins 104 which interfit with the slotted portion 82, 84 of the upright sleeves 16 or 18 respectively, to hold the circular scale ring 102 in fixed angular relation to the base 12 of the cassette holder 10. An indicator 106 is provided on the film cassette tray 72 to indicate angulation of the film cassette tray with respect to the base of the cassette holder 10. The scale and indicator markings are formed as described above by treating the surface of the materials from which they are formed in a conventional manner. A washer 107 may be employed to space the cassette tray 72 away from the scale ring 102, reducing scarring of the scale by abrasion occasioned by the rotation of the tray. As will be appreciated by those skilled in the art, other methods of providing an indication of relative angulation could be provided, including, for example providing markings directly on the cassette clamps 46, 48 and upright telescoping elements 32, 34, and likewise directly on the cassette tray 72.

Thus, it can be seen that the film cassette holder 10 of the present invention provides for convenient placement of a film cassette adjacent a patient for imaging of a desired portion of the patient's anatomy, and provides convenient adjustable fixed support for a film cassette.

While the invention has been shown and described with respect to a specific embodiment thereof, it will be apparent that other variations and modifications of the embodiment shown and described herein could be employed within the intended spirit and scope of the invention. Accordingly, the invention is not to be limited in scope and effect except by the appended claims.

What is claimed is:

1. An X-ray film cassette holder adapted for use with medical imaging equipment, comprising: a base, an expandable frame carried by said base, said frame incorporating two upwardly expandable risers releasably lockable in a plurality of expanded positions, said risers separated by a releasably lockable variable distance; and two film cassette clamps, each of which is pivotably carried by one of said upwardly expandable risers, and releasably lockable in fixed angular relation to said one of said upwardly expandable risers.

2. The X-ray film cassette holder of claim 1, further comprising a first base portion of said base and a second base portion of said base, each independently carrying a portion of said expandable frame and separately connected thereto, said first base portion and said second base portion being slidably connected by said expandable frame.

3. The X-ray film cassette holder of claim 2, wherein said expandable frame embodies an expandable transverse portion adjacent said base, and said first base portion is fixedly attached to a first end of said expandable transverse portion, and said second base portion is fixedly attached to a second end of said expandable transverse portion.

4. The X-ray film cassette holder of claim 3, wherein said expandable transverse portion further comprises a level sleeve disposed adjacent to said base and fixedly connected to said first base portion, and a level telescoping element slidably disposed within said sleeve fixedly connected to said second base portion, said sleeve and telescoping element being releasably lockable with respect to relative motion, whereby said frame is releasably lockable in a plurality of expanded positions wherein said telescoping element is extended out of said sleeve to a greater or lesser extent and then releasably locked into place.

5. The X-ray film cassette holder of claim 4, further comprising a locking screw engaged in a threaded hole formed in said level sleeve disposed adjacent said base adapted to releasably lock said level telescoping element and said level sleeve in fixed relationship by a frictional engagement therebetween.

6. The X-ray film cassette holder of claim 1, further comprising an upright sleeve and upright telescoping element having first and second ends slidably disposed therein, releasably lockable in fixed relation to said upright sleeve, together forming one of said two upwardly expandable risers, the first end of said telescoping member being disposed within said upright sleeve, and the second end of said telescoping element being disposed outside of said upright sleeve, one of said film cassette clamps being disposed adjacent said second end of said telescoping member.

7. The X-ray film cassette holder of claim 7, further comprising a locking screw engaged in a threaded hole formed in said upright sleeve adapted to releasably lock said upright telescoping element and said upright sleeve in fixed relationship by a frictional engagement therebetween.

8. The X-ray film cassette holder of claim 7, further comprising a film cassette tray pivotably and releasably mounted between said risers, adapted to receive and carry a film cassette; and locking screws pivotably carrying said cassette tray, said locking screws releasably engaging said risers and said cassette tray and releasingly holding them together in a releasable fixed positional and rotational relationship, to provide an adjustable fixed mounting of said film cassette in said cassette tray.

9. The X-ray film cassette holder of claim 8, further comprising a slider element slidably received in said upright sleeve; and a slotted portion in said upright sleeve, said slider element adapted to threadably engage said locking screws releasably lockably engaging said risers and said cassette tray, said locking screws extending through said slotted portion of said upright sleeve and into said slider element.

10. An X-ray film cassette holder adapted for use with medical imaging equipment, comprising:

an expandable base, releasably lockable in a multiplicity of expanded positions;

two upwardly expandable risers carried by said base, each expandable riser being releasably lockable in a multiplicity of expanded positions, separated by a releasably lockable variable distance variable with the expansion of said base; and two film cassette clamps, each of which is pivotably carried by one of said upwardly expandable risers, and releasably lockable in fixed angular relation to said one of said upwardly expandable risers.

11. The X-ray film cassette holder of claim 10, further comprising a first base portion and a second base portion, each independently carrying a portion of said expandable frame and separately connected thereto, said first base portion and said second base portion being slidably connected by said expandable frame.

12. The X-ray film cassette holder of claim 12, wherein said expandable frame embodies an expandable transverse portion adjacent said base, and said first base portion is fixedly attached to a first end of said expandable transverse portion, and said second base portion is fixedly attached to a second end of said expandable transverse portion and wherein said expandable transverse portion further comprises a level sleeve disposed adjacent to said base and fixedly connected to said first base portion, and a level telescoping element slidably disposed within said sleeve fixedly connected to said second base portion, and a locking screw engaged in a threaded hole formed in said level sleeve, said level sleeve and telescoping element being releasably lockable with respect to relative motion, whereby said frame is releasably lockable in a plurality of expanded positions wherein said telescoping element is extended out of said sleeve to a greater or lesser extent and then releasably locked into place, said locking screw being adapted to releasably lock said level telescoping element and said level sleeve in fixed relationship by a frictional engagement therebetween.

13. The X-ray film cassette holder of claim 12, further comprising an upright sleeve and upright telescoping element having first and second ends slidably disposed therein, and a locking screw adapted to releasably lock said telescoping element in a releasably lockable in fixed relation to said upright sleeve, together forming one of said two upwardly expandable risers, the first end of said telescoping member being disposed within said upright sleeve, and the second end of said telescoping element being disposed outside of said upright sleeve, one of said film cassette clamps being disposed adjacent said second end of said telescoping member, said locking screw being threadably engaged in a threaded hole formed in said upright sleeve.

14. The X-ray film cassette holder of claim 13, further comprising a film cassette tray pivotably and releasably mounted between said upwardly expandable risers, adapted to receive and carry a film cassette; and locking screws pivotably carrying said cassette tray, said locking screws releasably engaging said risers and said cassette tray and releasingly holding them together in a releasable fixed positional and rotational relationship, to provide an adjustable fixed mounting of the film cassette in said cassette tray.

15. The X-ray film cassette holder of claim 14, further comprising a slider element slidably received in said upright sleeve; and a slotted portion in said upright sleeve, said slider element adapted to threadably engage said locking screws releasably lockably engaging said risers and said cassette tray, said locking screws extending through said slotted portion of said upright sleeve and into said slider element.

16. The X-ray film cassette holder of claim 14, further comprising a channel formed in said upright telescoping member adapted to receive said locking screw threadably engaged in said upright sleeve adapted to fictionally engage said upright telescoping member within said upright sleeve.

17. The X-ray film cassette holder of claim 15, further comprising a scale adapted to indicate the inclination of a film cassette held by said cassette holder with respect to said base thereof.

18. An X-ray film cassette holder adapted for use with medical imaging equipment to image a selected portion of a patient's anatomy, comprising:

an expandable base, releasably lockable in a multiplicity of expanded positions;

two upwardly expandable risers, releasably lockable in a multiplicity of expanded positions, separated by a releasably lockable variable distance variable with the expansion of said base;

two film cassette clamps, each of which is pivotably carried by one of said upwardly expandable risers, and releasably lockable in fixed relation thereto; and a film cassette tray pivotably releasably attached to each of said upwardly expandable risers, adapted to receive and carry an X-ray film cassette, said film cassette tray being releasably lockable with respect to said pivotable attachment thereby being releasably lockable in a fixed position with respect to said risers, whereby a film cassette can be releasably fixed in a relative position and orientation with respect to said base, allowing fixed placement with respect to said selected portion of a patient's anatomy.

19. The X-ray film cassette holder of claim 18, further comprising a first ba e portion and a second base portion, each independently carrying a portion of said expandable frame and separately connected thereto, said first base portion and said second base portion being slidably connected by said expandable frame, and wherein said expandable frame embodies an expandable transverse portion adjacent said base, and said first base portion is fixedly attached to a first end of said expandable transverse portion, and said second base portion is fixedly attached to a second end of said expandable transverse portion and wherein said expandable transverse portion further comprises a level sleeve disposed adjacent to said base and fixedly connected to said first base portion, and a level telescoping element slidably disposed within said sleeve fixedly connected to said second base portion, and a locking screw engaged in a threaded hole formed in said level sleeve, said level sleeve and telescoping element being releasably lockable with respect to relative motion, whereby said frame is releasably lockable in a plurality of expanded positions wherein said telescoping element is extended out of said sleeve to a greater or lesser extent and then releasably locked into place, said locking screw being adapted to releasably lock said level telescoping element and said level sleeve in fixed relationship by a frictional engagement therebetween.

20. The X-ray film cassette holder of claim 19, wherein said film cassette tray pivotably and releasably mounted between said upwardly expandable risers, adapted to receive and carry a film cassette of a selected size, and further comprising locking screws pivotably carrying said cassette tray, said locking screws releasably engaging said risers and said cassette tray and releasingly holding them together in a releasable fixed positional and rotational relationship, to provide an adjustable fixed mounting of the film cassette in said cassette tray, said tray being adjustable in position above said base.

* * * * *